US011047520B1

(12) United States Patent
Schwind

(10) Patent No.: US 11,047,520 B1
(45) Date of Patent: Jun. 29, 2021

(54) ETCHING EASEL APPARATUS

(71) Applicant: John Schwind, Berlin, NH (US)

(72) Inventor: John Schwind, Berlin, NH (US)

( * ) Notice: Subject to any disclaimer, the term of this patent is extended or adjusted under 35 U.S.C. 154(b) by 0 days.

(21) Appl. No.: 16/884,247

(22) Filed: May 27, 2020

(51) Int. Cl.
| *F16M 11/10* | (2006.01) |
| *A47B 97/08* | (2006.01) |
| *F16M 11/04* | (2006.01) |
| *B44B 3/06* | (2006.01) |
| *A47B 9/16* | (2006.01) |

(52) U.S. Cl.
CPC ............ *F16M 11/10* (2013.01); *A47B 97/08* (2013.01); *B44B 3/065* (2013.01); *F16M 11/041* (2013.01); *F16M 11/046* (2013.01); *A47B 9/16* (2013.01); *F16M 2200/024* (2013.01)

(58) Field of Classification Search
CPC .... F16M 11/10; F16M 11/041; F16M 11/046; F16M 2200/024; F16M 11/38; A47B 97/04; A47B 97/08; A47B 9/16; A47G 2001/146; A47G 1/14; A47G 1/166; A47G 1/08; B44B 3/065; B66F 7/065
USPC ............ 248/451–453, 447.1, 458, 454, 371, 248/349.1, 420, 447, 455, 441.1
See application file for complete search history.

(56) References Cited

U.S. PATENT DOCUMENTS

| 1,531,540 | A | * | 3/1925 | Calero | ................... | B41J 29/15 |
| | | | | | | 248/441.1 |
| 2,954,630 | A | * | 10/1960 | Hull | ................... | A47G 1/0644 |
| | | | | | | 40/761 |
| 3,278,150 | A | * | 10/1966 | Pedee | ................... | A47B 97/08 |
| | | | | | | 248/456 |
| 3,632,101 | A | * | 1/1972 | Ross | ................... | A47B 97/04 |
| | | | | | | 269/70 |
| 3,799,488 | A | * | 3/1974 | Sena | ................... | A47B 97/08 |
| | | | | | | 248/452 |
| 3,926,398 | A | * | 12/1975 | Vincent | ................. | A47B 97/08 |
| | | | | | | 248/448 |
| 4,753,408 | A | * | 6/1988 | Wailes | ................... | H04R 1/026 |
| | | | | | | 108/145 |
| 4,826,124 | A | * | 5/1989 | Kindig | ................... | A47B 97/04 |
| | | | | | | 16/349 |
| 4,926,760 | A | * | 5/1990 | Sack | ................... | B65G 1/07 |
| | | | | | | 108/145 |
| 5,205,526 | A | * | 4/1993 | Deutsch | ................. | A47B 97/08 |
| | | | | | | 248/188.8 |
| 5,400,720 | A | * | 3/1995 | Stevens | ................... | A47B 9/16 |
| | | | | | | 108/147 |

(Continued)

*Primary Examiner* — Ingrid M Weinhold
(74) *Attorney, Agent, or Firm* — Dale J. Ream

(57) ABSTRACT

An etching easel apparatus includes an easel backboard having a board front side, a board back side, and connecting edges that, together, define a recessed area. A bottom lip is coupled to the board bottom edge of the easel backboard portion and extends perpendicularly from the board front side and laterally between the left and right edges. A top lip is pivotally coupled to the board top edge of the easel backboard portion and extends perpendicularly from the board front side. The top lip is configured to secure an etching plate against the board front side and the bottom lip. A wall mount is coupled to the board back side of the easel backboard portion and has a pair of mounting apertures configured to receive hardware inserted into a wall. The apparatus includes a height adjustable table stand configured to support the backboard.

3 Claims, 9 Drawing Sheets

(56) References Cited

U.S. PATENT DOCUMENTS

| | | | | |
|---|---|---|---|---|
| 5,725,192 A * | 3/1998 | Cloninger | A47B 97/04 248/447 |
| 6,889,952 B2 * | 5/2005 | Cook | A47B 97/08 248/448 |
| 7,677,518 B2 * | 3/2010 | Chouinard | A47B 21/02 248/370 |
| 7,740,219 B2 * | 6/2010 | Stengel | A47B 97/08 248/464 |
| 7,984,889 B2 * | 7/2011 | Whitley | F16M 11/16 248/371 |
| 8,770,536 B2 * | 7/2014 | Hu | G01R 31/2808 248/447 |
| 8,905,362 B2 * | 12/2014 | Hu | G01R 31/2808 248/185.1 |
| 9,220,343 B2 * | 12/2015 | Selwa | A47B 97/04 |
| 9,635,929 B1 * | 5/2017 | Wu | A47B 3/02 |
| 10,258,148 B1 * | 4/2019 | Donner | A47B 17/02 |
| RE47,426 E * | 6/2019 | Selwa | A47B 97/04 |
| 10,349,760 B2 * | 7/2019 | Peake | A47G 1/166 |
| 2007/0040089 A1 * | 2/2007 | Shift | A47B 97/04 248/448 |
| 2009/0173866 A1 * | 7/2009 | Huang | G06F 1/1632 248/371 |
| 2009/0242723 A1 * | 10/2009 | Starcher | A47B 97/08 248/460 |
| 2011/0138666 A1 * | 6/2011 | Borde | A47G 1/166 40/747 |
| 2013/0153729 A1 * | 6/2013 | Hu | G01R 31/2808 248/316.5 |
| 2014/0263922 A1 * | 9/2014 | Hickman | A47B 97/04 248/447.1 |
| 2014/0326846 A1 * | 11/2014 | Selwa | A47B 97/04 248/448 |
| 2016/0270564 A1 * | 9/2016 | Peake | A47G 1/166 |

* cited by examiner

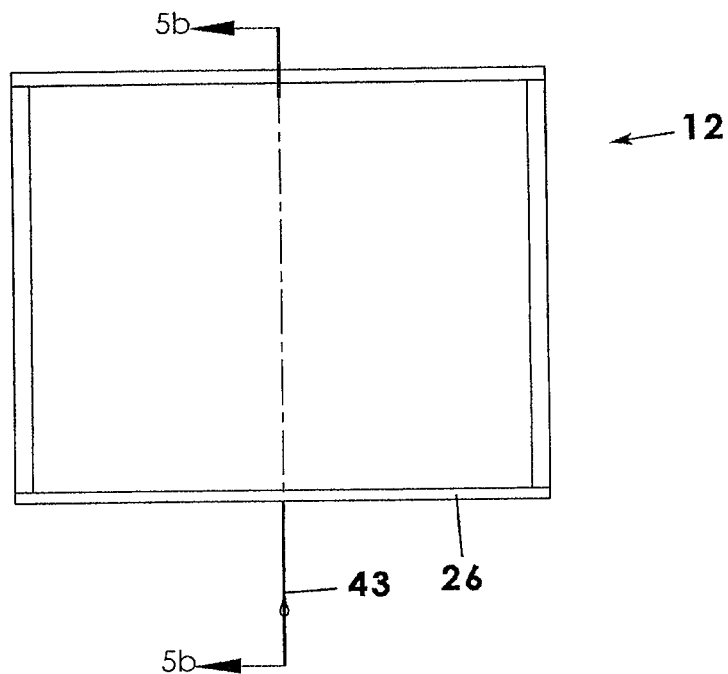
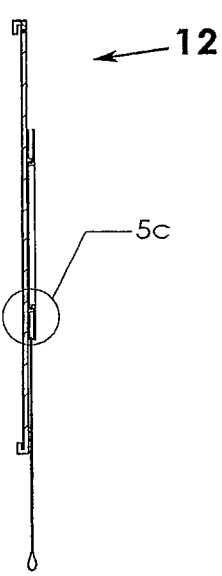
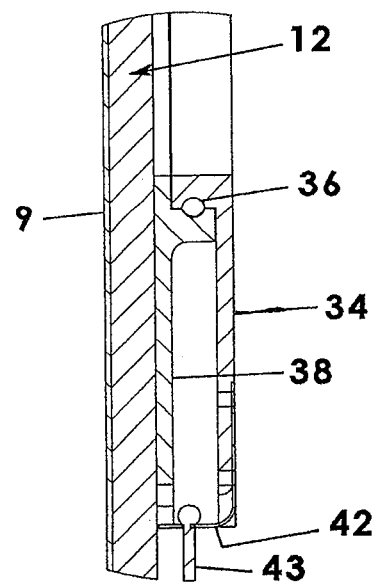
Fig.5a
Fig.5b
Fig.5c

US 11,047,520 B1

ETCHING EASEL APPARATUS

BACKGROUND OF THE INVENTION

The disclosure relates to easel devices and more particularly pertains to a new easel device for securing an etching plate.

Creating works of art are much more varied today than just brushing paint on a canvas or sketching with a pen or pencil. For instance, artists may desire to etch a design onto a piece of stone, metal, or the like. Etching refers to apply a sketch to a metal plate as opposed to a canvas and may be accomplished using an etching tool rather than a brush. It is difficult to etch a metal plate, however, unless the plate is held securely while the artist etches a design. A traditional easel, unfortunately, is not typically constructed in a manner capable of holding a metal plate during an etching event.

Various devices have been proposed in the prior art relates to easel devices designed for canvases and painting. Existing devices are not designed for etching and thus do not have a way to secure an etching plate. In addition, existing easels also do not have the ability to be either rotatably mounted to a wall or to be perched at an angle on a flat surface.

Therefore, it would be desirable to have an etching easel apparatus having a structure for securing a metal plate in a position that is convenient for an artist to etch a design upon a surface of the metal plate. Further, it would be desirable to have an etching easel apparatus that may include a wall mount portion configured to receive and hold the metal plate at a selected height on a wall. In addition, it would be desirable to have an etching easel apparatus that is able to rotate or swivel relative to the wall. Even further, it would be desirable to have an etching easel apparatus that may include a table stand upon which the backboard may be received.

SUMMARY OF THE INVENTION

An etching easel apparatus according to the present invention includes an easel backboard portion having a board front side, a board back side, a board left edge, a board right edge, a board top edge, and a board bottom edge that, together, define a recessed area. A bottom lip is coupled to the board bottom edge of the easel backboard portion and extends perpendicularly from the board front side and laterally between the left and right edges. A top lip is pivotally or hingedly coupled to the board top edge of the easel backboard portion and extends perpendicularly from the board front side and laterally between the left and right edges. The top lip is configured to secure an etching plate against the board front side and the bottom lip. A wall mount is coupled to the board back side of the easel backboard portion and has a pair of mounting apertures configured to receive hardware inserted into a wall.

Therefore, a general object of this invention is to provide an etching easel apparatus that securely holds a metal plate in a position for etching an artistic design on the plate.

Another object of this invention is to provide an etching easel apparatus, as aforesaid, having a top and bottom lips that cooperate to hold the etching plate.

Still another object of this invention is to provide an etching easel apparatus, as aforesaid, that may be mounted to a wall and is configured to rotate thereon.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

This discloser will be better understood and objects other than those set forth above will become apparent when consideration is given to the following detailed description thereof. Such description makes reference to the annexed drawings wherein:

FIG. 3b is an isolated view on an enlarged scale taken from FIG. 3a;

FIG. 3c is an isolated view on an enlarged scale taken from FIG. 3a;

FIG. 3e is an isolated view on an enlarged scale taken from FIG. 3a;

FIG. 4b is a back perspective view of the easel portion as in FIG. 4a;

FIG. 5a is a front view of the easel portion of FIG. 4a, illustrated with a locking spring tab in an engaged configuration;

FIG. 5b is a sectional view taken along line 5b-5b of FIG. 5a;

FIG. 5c is an isolated view on an enlarged scale taken from FIG. 5b;

FIG. 6b is a sectional view taken along line 6b-6b of FIG. 6a;

DETAILED DESCRIPTION OF THE INVENTION

Figure 1:
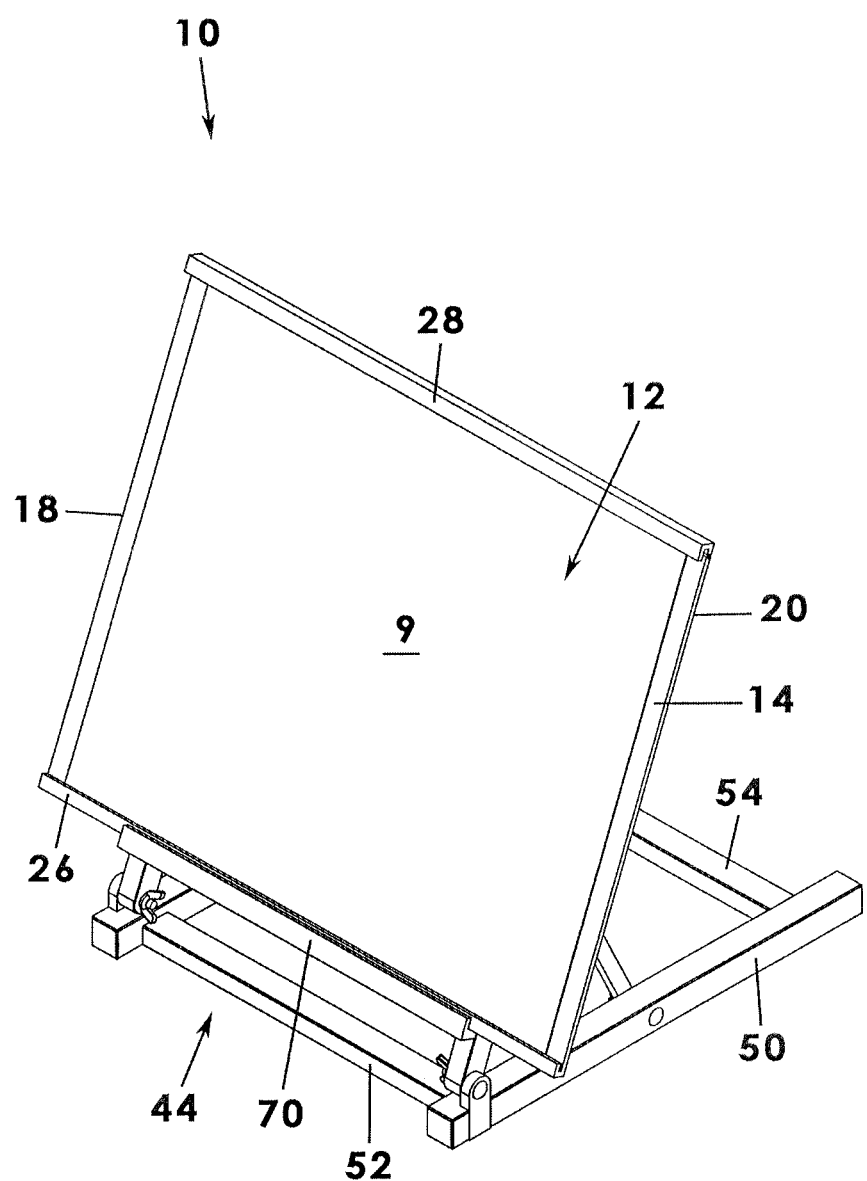
FIG. 1 is an isometric view of an etching easel apparatus according to an embodiment of the disclosure.
Figure 2:
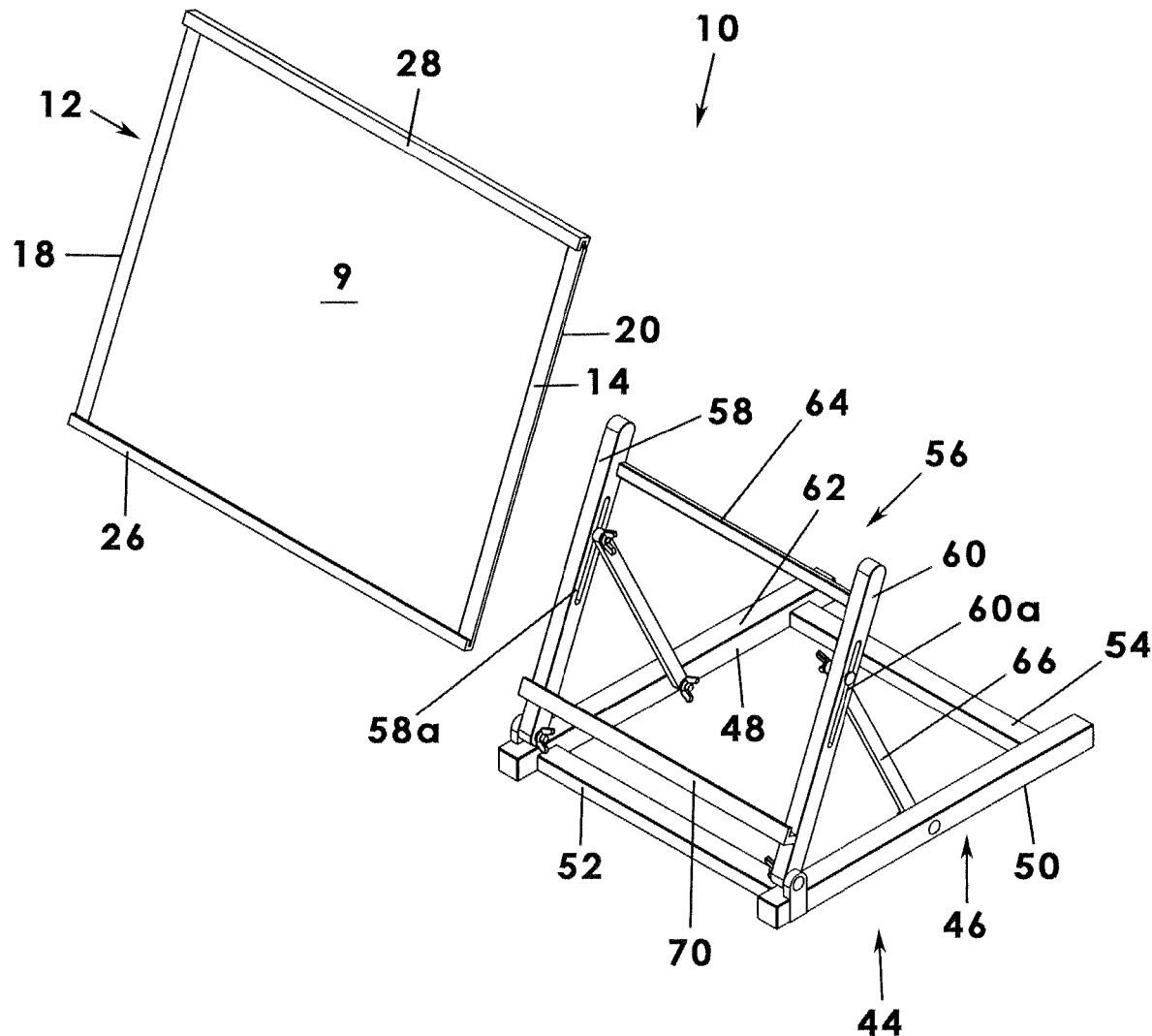
FIG. 2 is an exploded view of the etching easel apparatus as in FIG. 1.
Figure 3A:
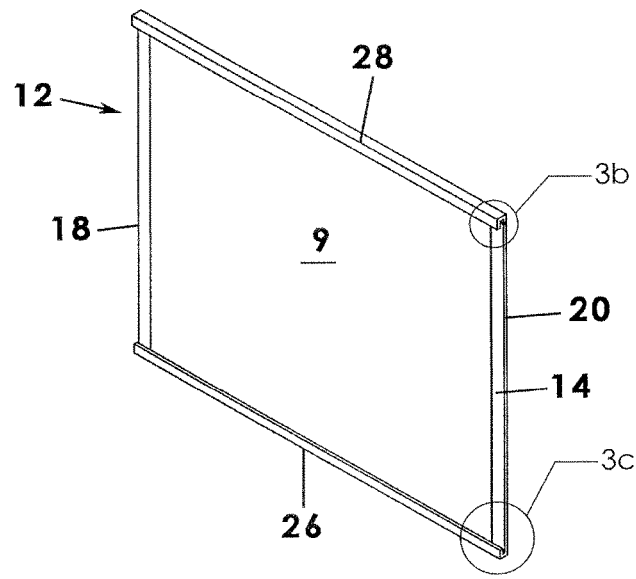
FIG. 3a is a perspective view of the easel portion removed from the apparatus of FIG. 1.
Figure 3D:
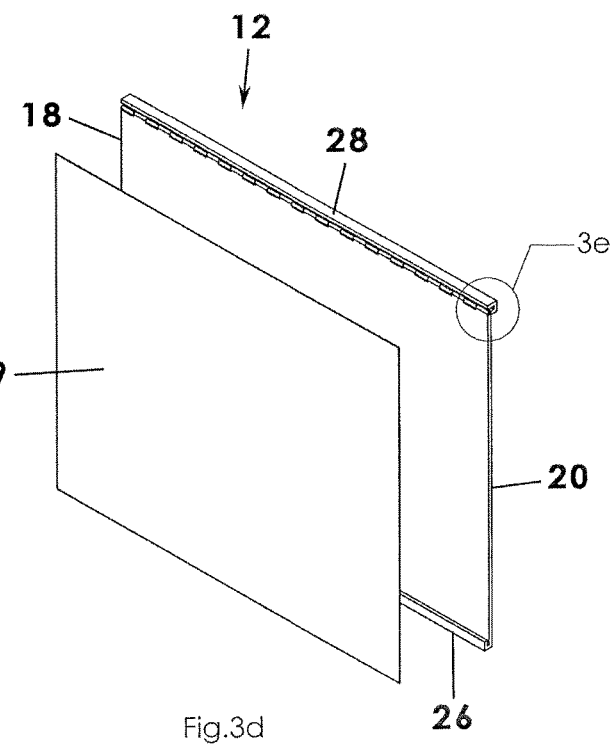
FIG. 3d is an exploded view of the easel portion as in FIG. 3a with a metal plate separated from a backboard.
Figure 3B:
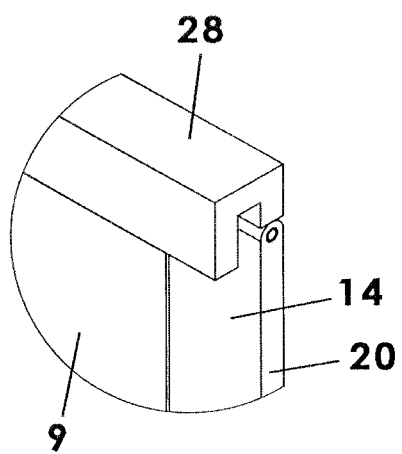
Figure 3C:
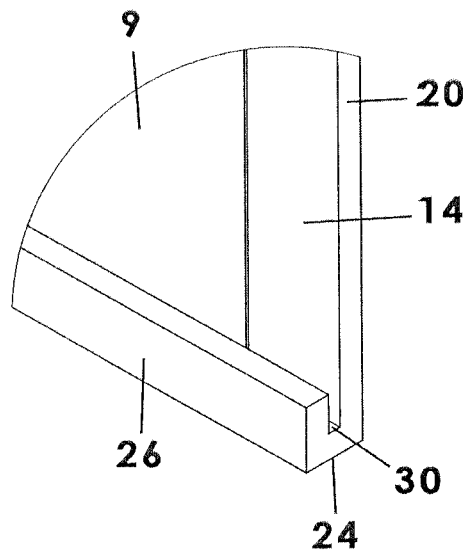
Figure 3E:
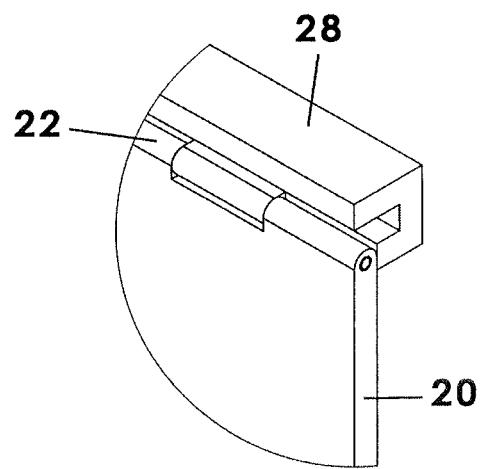
Figure 4A:
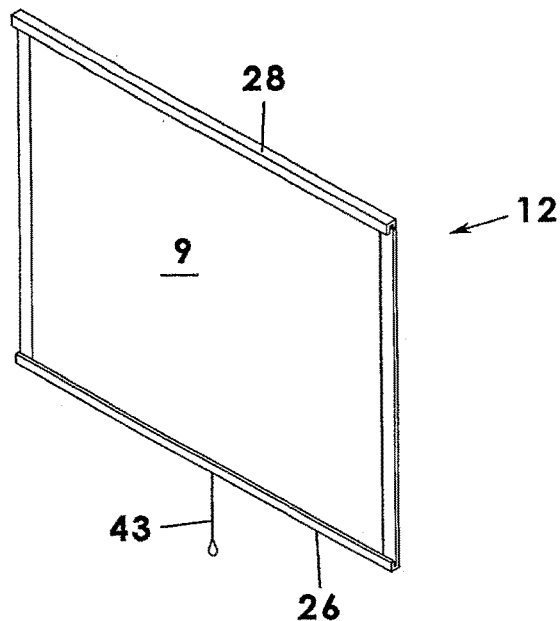
FIG. 4a is a front perspective view of the easel portion removed from the apparatus of FIG. 1.
Figure 4B:
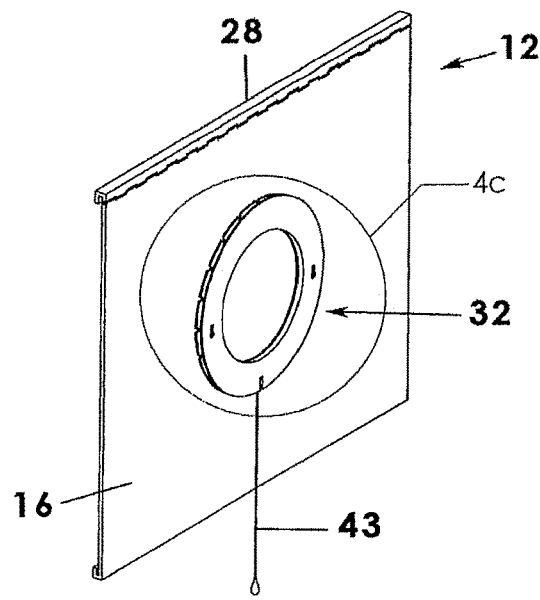
Figure 4C:
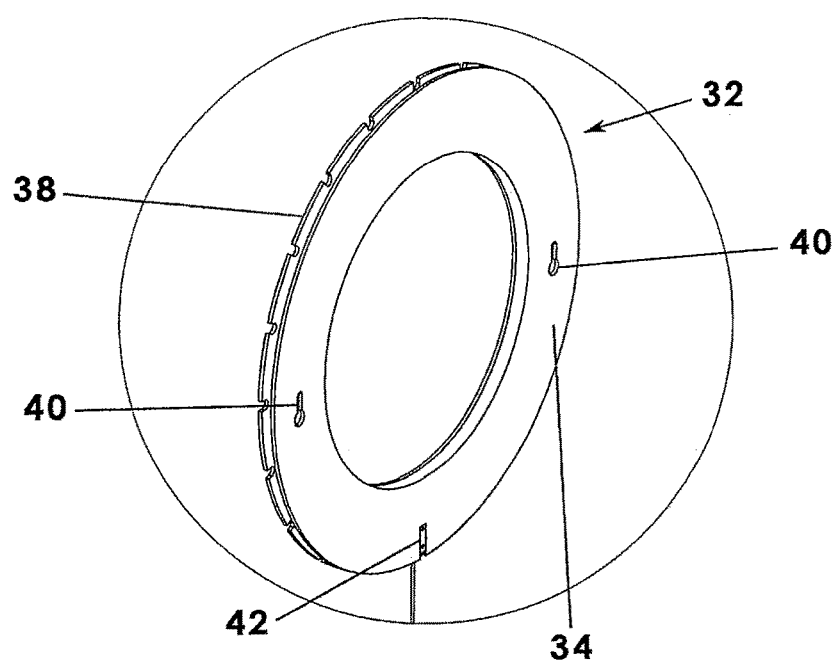
FIG. 4c is an isolated view on an enlarged scale taken from FIG. 4b.
Figure 6A:
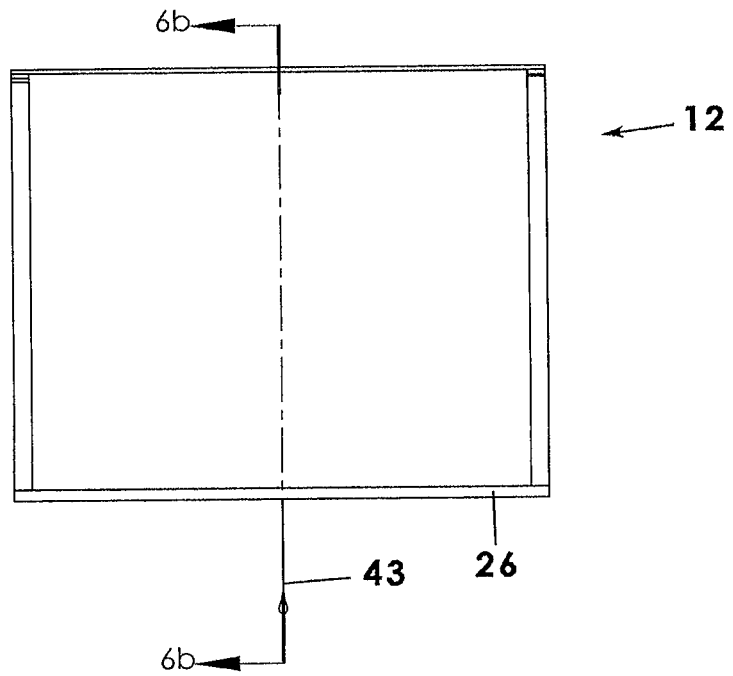
FIG. 6a is a front view of the easel portion of FIG. 4a, illustrated with a locking spring tab in a released configuration.
Figure 6B:
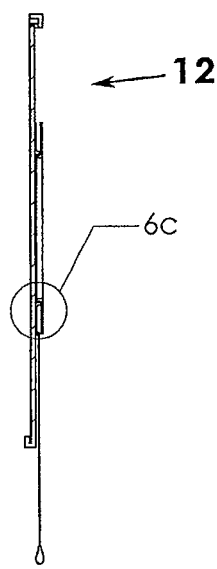
Figure 6C:
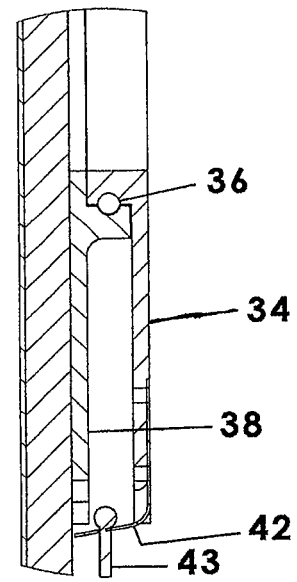
FIG. 6c is an isolated view on an enlarged scale taken from FIG. 6b.
Figure 7:
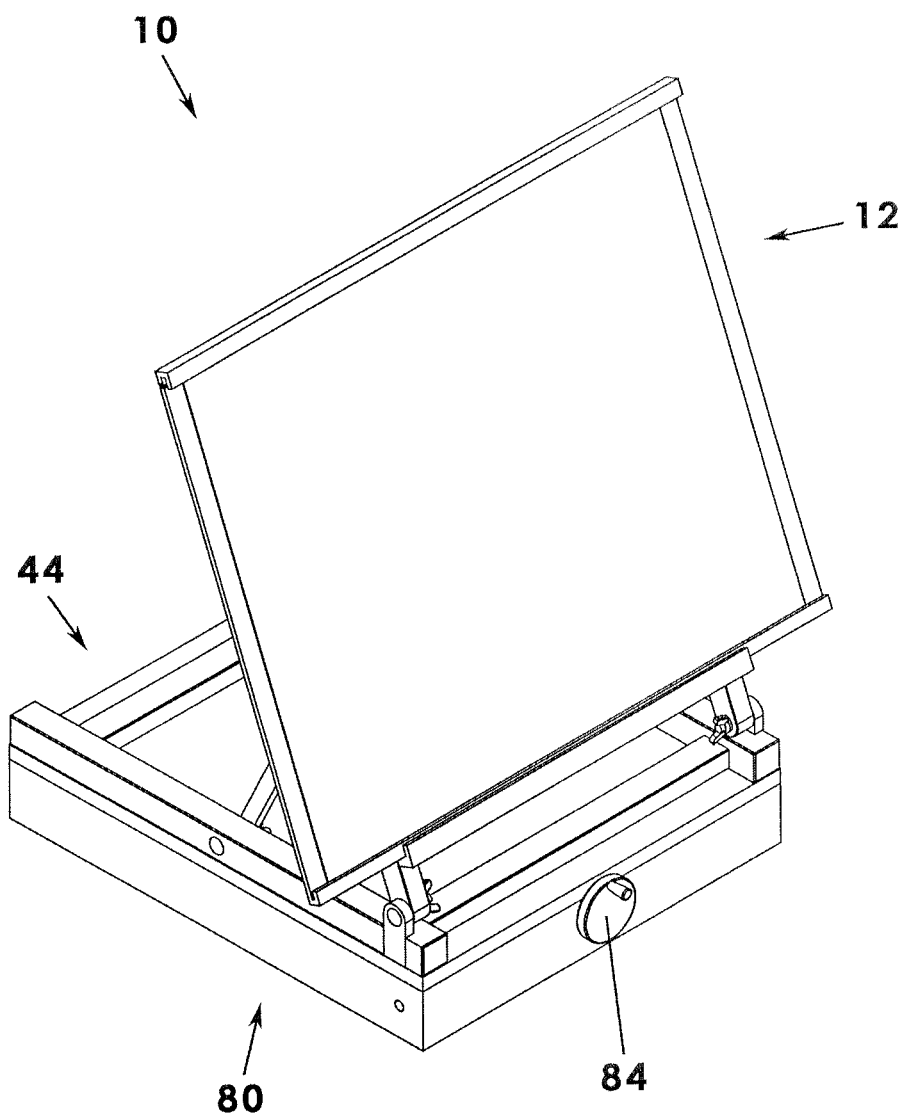
FIG. 7 is an isometric view of a table mounted etching easel apparatus including a riser assembly according to the present invention, illustrated in a retracted configuration.

An etching easel apparatus according to a preferred embodiment of the present invention will be described with reference to FIGS. 1 to 8 of the accompanying drawings. The etching easel apparatus 10 includes an easel backboard 12 having a wall mounting portion. A desktop etching easel, also referred to as a table stand 44 is also included in the present invention. The table stand 44 may include a riser 80 for adjusting the height of the table stand 44 when actuated.

As best illustrated in FIGS. 1 through 4, one aspect of the etching easel apparatus 10 generally comprises an easel backboard 12 having a board front side 14, a board back side 16, a board left edge 18, a board right edge 20, a board top edge 22, and a board bottom edge 24. Preferably, the length of the board left edge 18 and the board right edge 20 may be equal to ⅔ of the length of the board top edge 22 and the board bottom edge 24. Together, the structures of the backboard and, more particularly, the board front side 14, may define a recessed area for receiving an etching plate 9.

A bottom lip 26 is coupled to the board bottom edge 24 and extends perpendicularly from the board front side 14 and extends away therefrom. The bottom lip 26 may be configured as a bracket or shelf defining an upwardly open recess operable to receive an etching plate therein. Similarly, a top lip 28 may be pivotally coupled to the board top edge 22, such as with a hinge, and extends perpendicularly from the board front side 14 when in a closed position. The top lip 28 is pivotally movable, i.e. swings to extend coplanar with the board front side 14 in a released position. Similarly, the top lip 28 is configured to secure the etching plate 9 against the board front side 14 and the bottom lip 26 when in the secure position. Each of the bottom lip 26 and the top lip 28 may have an L-shaped configuration and an inner extension length 30 (FIG. 3c) conforming to a thickness of the etching plate 9 to snugly secure the etching plate in place. Preferably, the inner extension length may be about ⅛". Specifically, the bottom lip 26 is upwardly open for engaging and receiving the etching plate 9. Similarly, the top lip 28 is downwardly open for engaging and receiving the etching plate 9.

In an embodiment (not shown), the etching plate 9 may be glued to the board front side 14, mounted with suction cups, or the like.

The easel backboard 12 may include a wall mount assembly. More particularly, a rotatable wall mount 32 is coupled to the back side 16 easel backboard 12. The wall mount 32 may have a mount portion 34, a plurality of ball bearings 36, and a rotational portion 38 rotatably coupled to the mount portion 34 and fixedly coupled to the board back side 16. Preferably, the plurality of ball bearings 36 is in operative communication with the rotational portion 38 so as to facilitate smooth rotation thereof. The mount portion. 34 may define a pair of mounting apertures 40 configured to receive hardware inserted into a wall Moil and operable for hanging the etching easel apparatus 10 on a vertical wall. The wall mount 32 may include a locking tab 42 to selectively prevent rotation when the apparatus 10 is in use and the locking tab 42 is actuated. The tab 42 may be actuated by a pull cord 43 or similar actuator as contrasted in FIGS. 5c and 6c and may be spring loaded toward the locking (non-rotation) position.

In a critical aspect, the easel apparatus 10 includes a table stand 44. The table stand 44 includes a stand base 46 having a base left portion 48, a base right portion 50 displaced from and parallel to the base left portion 48. For stability and strength, the stand base 46 may include a front support member 52 and a back support member 54, both of which extend between the base left portion 48 and base right portion 50. A stand frame 56 is coupled to the stand base 46 and extends upwardly therefrom. The stand frame 56 may have a frame left section 58 and a frame right section 60 pivotally coupled to a base top side 62 of the base left portion 48 and the base right portion 50, respectively. For stability and strength, a frame brace 64 may extend between the frame left section 58 and the frame right section 60 proximate distal ends of each, respectively.

Further, a pair of frame supports 66 may be pivotally coupled to the base left portion 48 and the base right portion 50. The pair of frame supports 66 is slidably and pivotally coupled to the frame left section 58 and the frame right section 60. Each frame support 66 includes a proximal end pivotally coupled to a base left portion 48 and base right portion 50, respectively, and includes a distal end coupled to frame left section 58 and frame right section 60 and, specifically positioned in respective slots 58a, 60a with a fastener as further described below. More particularly, each of the frame left section 58 and the frame right section 60 has a first end, respectively, pivotally coupled to a top side 62 of the base left portion 48 and base right portion 50, respectively. Likewise, each of the frame left section 58 and the frame right section 60 has a second end opposite the first end, respectively.

Further to the description above, each of the frame left section 58 and the frame right section 60 defines an adjustment slot 58a, 60a to allow adjustment of the angle of the stand frame 56 or to allow it to fold flat with the stand base 46. It is understood that distal ends of the frame supports 66 are positioned in the adjustment slots 58a, 60a with fasteners (such as wing nuts) as described above and for selective height adjustment of the frame left section 58 and the frame right section 60.

In addition, a stand lip 70 is coupled to the stand 56 to selectively receive and support the easel backboard 12 and the bottom lip 26 described earlier. The stand lip may have a generally L-shaped configuration that is upwardly open to receive the bottom lip 26 of the easel backboard 12. In other words, the easel backboard 12 may be supported upon the table stand 44 and, as a result, are each components of a unitary invention and of the apparatus 10.

Figure 8:
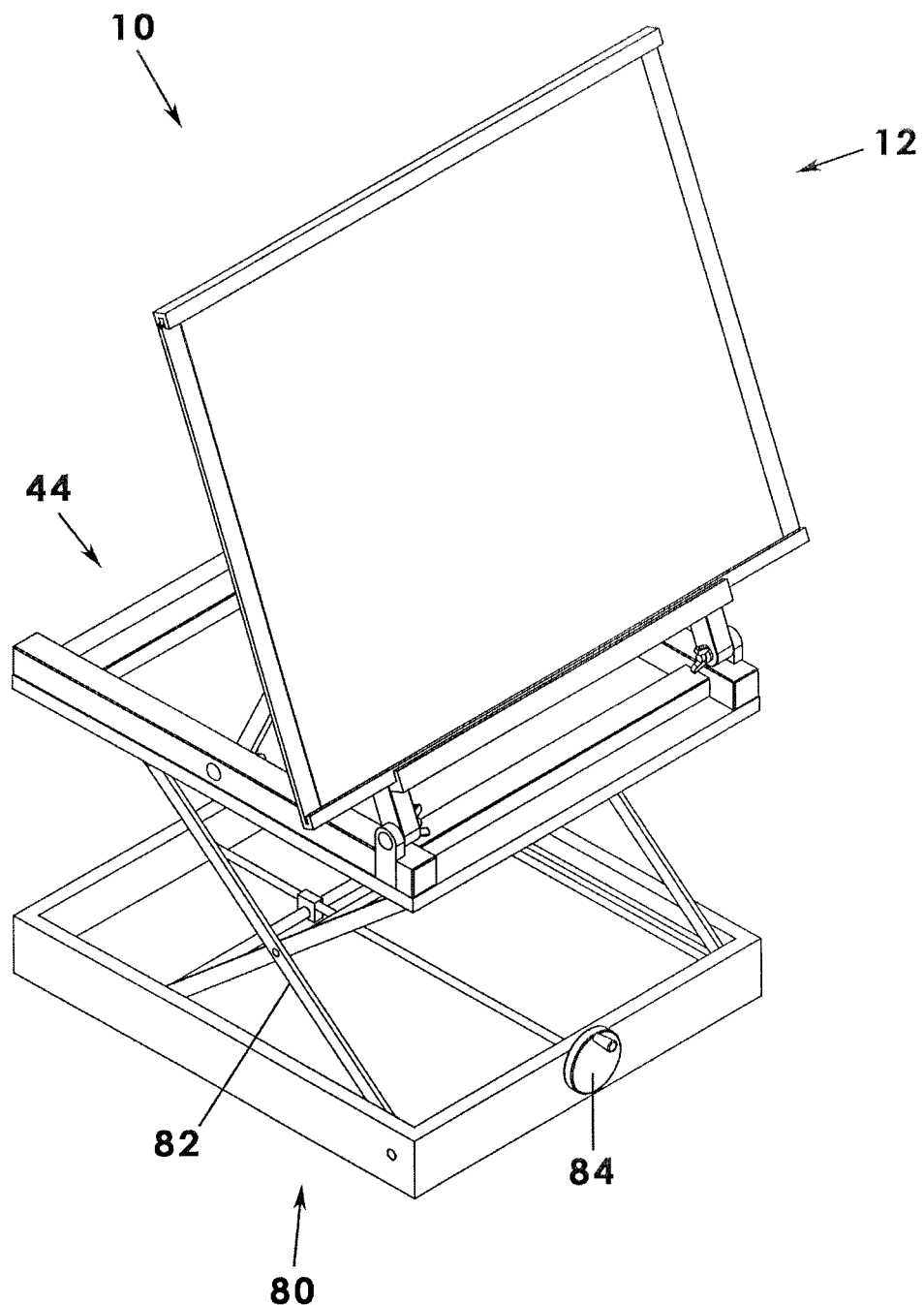
FIG. 8 is another isometric view of a table mounted etching easel apparatus as in FIG. 8, illustrated in a deployed configuration.

In another aspect, the table stand 44 may include at least one riser 80 coupled to a bottom surface of the base left portion 48 and base right portion 50 of the stand base 46. The riser 80 may include a jack 82 having at least a pair of legs (e.g. a scissor jack) configured in a criss-cross arrangement that is movable between a retracted, folded, or minimized position (FIG. 7) and a deployed, raised, and extended configuration (FIG. 8). The riser 80 may include dial 84 (e.g. a crank) connected to the legs of the jack 82, such as via a linkage or gears so as to be operable to move the jack 82 between retracted and extended configurations as would be known to one of ordinary skill in the art of jacks. In other words, the position of the stand lip 26 relative to a table, countertop, or floor surface may be height adjustable and, thus, accommodating to the height of a user attempting to etch an artistic design onto the etching plate 9.

In another embodiment (not shown), the easel apparatus 10 includes a floor mount easel portion. Constructed in a manner similar to that described above, the floor mount easel device further includes a leg assembly having a main support member coupled to the backboard and extending downwardly. The leg assembly may include a plurality of legs coupled to a lower end of the main support member and extending in multiple downwardly sloping directions so as to support an etching plate 9 above a floor surface.

In use, the easel backboard 12 is either mounted to a wall with the wall mount 32 or the table stand 44 positioned on a table surface. An etching plate 9 may be positioned and held securely between the bottom lip 26 and top lip 28 as described above or placed on the stand lip 70 of the table stand, respectively. The etching plate 9 may then be worked on while securely held in place. If desired, the backboard 12 may be positioned on the table stand 44 rather than mounted to a wall, the height of which may be adjusted by actuation or release of the riser 80.

With respect to the above description then, it is to be realized that the optimum dimensional relationship for the parts of an embodiment enable by the disclosure, to include variations in size, materials, shape, form, function and manner of operations, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An etching easel apparatus for holding an etching plate, comprising:
   an easel backboard having a board front side and a board back side opposite the board front side that, together, define a planar configuration, the easel backboard having a board left edge, a board right edge, a board top edge, and a board bottom edge;
   a bottom lip coupled to the board bottom edge of the easel backboard, the bottom lip extending forwardly away from the board front side and extending laterally between said board left edge and said board right edge;
   wherein said bottom lip is upwardly open and operable to selectively receive the etching plate;
   a top lip operably coupled to the board top edge of the easel backboard with a hinge, the top lip extending generally upwardly from the board front side and then outwardly relative to the board front side and then downwardly, the top lip being configured to secure the etching plate against the board front side and the bottom lip;
   wherein said top lip is movable between a secured configuration defining an opening that is generally parallel with and facing downwardly relative to said board front side and a released configuration in which the opening is facing generally forwardly of the board front side;
   wherein said easel backboard includes a wall mount having a wall mount portion, and a rotational portion coupled to the board back side and rotatably coupled to the wall mount portion, said wall mount portion defining a pair of mounting apertures operable for mounting said wall mount portion to a wall;
   a table stand that includes:
      a stand base member having a base left portion and a base right portion displaced from and parallel to the base left portion;
      a stand frame coupled to the stand base member, the stand frame having a frame left section and a frame right section pivotally coupled to a top side of the base left portion and the base right portion, respectively, and extending upwardly;
      wherein said frame left section and said frame right section each defines a slot, respectively;
      a pair of frame supports pivotally coupled at a proximal end to said base left portion and the base right portion, respectively, and at a distal end positioned in said slot of said frame left section and said frame right section, respectively, and operable for adjusting a height of said frame left section and said frame right section; and
      a stand lip coupled to said stand frame and defining an L-shaped configuration configured to receive and support the easel backboard;
      a riser coupled to a bottom side of said base left portion and said base right portion of said stand base member, said riser having at least a pair of legs that are movable between a retracted configuration and a deployed configuration;
      wherein said pair of legs includes a scissor jack and a dial operatively connected to said scissor jack and configured to move said pair of legs between said retracted and said deployed configurations.

2. The etching easel apparatus as in claim 1, wherein said wall mount includes a locking tab for preventing rotation when actuated.

3. The etching easel apparatus as in claim 2, wherein said wall mount includes a plurality of ball bearings in communication with said rotational portion.

* * * * *